(12) United States Patent
Jiang et al.

(10) Patent No.: US 9,909,941 B2
(45) Date of Patent: Mar. 6, 2018

(54) HOIST MAIN SHAFT TORQUE MONITORING DEVICE BASED ON ANGLE MEASUREMENT

(71) Applicant: CHINA UNIVERSITY OF MINING AND TECHNOLOGY, Jiangsu (CN)

(72) Inventors: Fan Jiang, Jiangsu (CN); Zhencai Zhu, Jiangsu (CN); Wei Li, Jiangsu (CN); Guohua Cao, Jiangsu (CN); Gongbo Zhou, Jiangsu (CN); Yuxing Peng, Jiangsu (CN); Gang Shen, Jiangsu (CN); Hao Lu, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 117 days.

(21) Appl. No.: 14/909,856

(22) PCT Filed: May 29, 2014

(86) PCT No.: PCT/CN2014/078749
§ 371 (c)(1),
(2) Date: Feb. 3, 2016

(87) PCT Pub. No.: WO2015/109715
PCT Pub. Date: Jul. 30, 2015

(65) Prior Publication Data
US 2016/0187211 A1    Jun. 30, 2016

(30) Foreign Application Priority Data

Jan. 22, 2014    (CN) .......................... 2014 1 0028896

(51) Int. Cl.
*G01L 3/08*    (2006.01)
*G01L 3/12*    (2006.01)

(52) U.S. Cl.
CPC . *G01L 3/08* (2013.01); *G01L 3/12* (2013.01)

(58) Field of Classification Search
CPC ............ G01L 3/08; G01L 3/12; G01L 3/1421
See application file for complete search history.

(56) References Cited

U.S. PATENT DOCUMENTS 5,389,780 A    2/1995  Anderson
5,855,072 A *  1/1999  Nakaho ................ B62D 15/022
                                              33/1 N
(Continued)

FOREIGN PATENT DOCUMENTS

CN    1228532 A    9/1999
CN    2755582 Y    2/2006
(Continued)

OTHER PUBLICATIONS

International Search Report for PCT/CN2014/078749 dated Oct. 29, 2014.

*Primary Examiner* — Lisa Caputo
*Assistant Examiner* — Philip Cotey
(74) *Attorney, Agent, or Firm* — Heslin Rothenberg Farley & Mesiti, P.C.

(57) ABSTRACT

A hoist main shaft torque monitoring device based on angle measurement, constituted primarily by a first base, a second base, a light generating unit, a shutter, and a light sensing element; the light source, a first lens, and a first optical aperture arranged in the light generating unit, as well as a second optical aperture, second lens, and light sensing element on the shutter, forming a light source generation, propagation, and reception pathway; when the elevator main shaft is subjected to a certain torque, a corresponding displacement is produced between the first optical aperture and the second optical aperture, thus measuring the change in amount of light ultimately reaching the second optical aperture so as to measure the twist angle of the rotary shaft and finally calculate the magnitude of the shaft torque. Without damaging the original equipment and foundation, (Continued)

the device measures the torque of the shaft at different rotational speeds. The device can measure stationary torque and torque at different rotational speeds of the shaft, without the electromagnetic field interfering with wireless transmission; the device is easy to use, maintenance costs are low, and it is of interest for widespread popularization.

3 Claims, 2 Drawing Sheets

(56) References Cited

U.S. PATENT DOCUMENTS

| | | | |
|---|---|---|---|
| 6,318,187 B1 * | 11/2001 | Griepentrog | G01D 5/28 73/862.324 |
| 6,460,422 B1 * | 10/2002 | Kuroda | G01L 3/12 73/862.324 |
| 2008/0041141 A1 * | 2/2008 | Discenzo | G01L 1/241 73/66 |
| 2009/0266178 A1 | 10/2009 | Matzoll, Jr. et al. | |

FOREIGN PATENT DOCUMENTS

| CN | 102393268 A | 3/2012 |
|---|---|---|
| CN | 103792035 A | 5/2014 |

\* cited by examiner

HOIST MAIN SHAFT TORQUE MONITORING DEVICE BASED ON ANGLE MEASUREMENT

CROSS REFERENCE TO RELATED APPLICATIONS

This application is a national stage filing under Section 371 of International Application No. PCT/CN2014/078749, filed on May 29, 2014, and published in Chinese on Jul. 30, 2015, as WO 2015/109715 A1, which claims priority of Chinese Patent Application No. 201410028896.4 filed on Jan. 22, 2014, the entire content of said applications being hereby incorporated herein by reference.

I TECHNICAL FIELD

The present invention relates to a hoist main shaft torque monitoring apparatus based on torsional angle measurement, which is especially suitable for torque monitoring of main shaft of mine hoists, and is also applicable to torque detection for other rotary objects such as rotating shafts.

II BACKGROUND ART

Hoists are a kind of typical rotating machinery widely applied in mines, and, as the "throats" of mines, take a very important role in the production in mines. As the modern industry and technology are developed rapidly and the requirement for high production efficiency is increasing, the structure of mine hoists becomes more and more complex, the hoisting capacity per run gets bigger and bigger, and the hoisting speed gets faster and faster, and hoisting distance gets longer and longer. Once a failure such as jamming, slipping, over-winding, or over-release occurs in the hoisting process of a mine hoist, a chain reaction may be triggered, and the hoisting condition not only affects the run of the equipment itself but also impacts subsequent production, and may even cause disastrous accidents and severe loss in national economy. Hence, it is necessary to monitor torque of the main shaft of mine hoists, because the torque of main shaft will change accordingly once jamming, slipping, over-winding, or rope breaking occurs on mine hoists.

Up to now, many torque measuring methods and devices have been invented. For example, a serials connection measurement method, in which a torque measuring device is connected in series on the tested unit, can be used. However, this method requires a change in the structural connection of the original tested unit and the cost will be high when it is applied to equipment that has been installed. Though the shaft torque can be measured by attaching strain foils to the shaft, the strain foils may fall off and the requirement for the precision of attachment of the strain foils is very high. Alternatively, though the shaft torque also can be measured by means of electromagnetic induction, electromagnetic induction may impact the effective transmission of wireless data. A shaft torque measuring method in which the shaft surface is treated appropriately (scribing lines, or installing coils, etc.) and then measuring devices are mounted at corresponding positions to realize the shaft torque measurement, requires one to mount supports on the original foundation and needs a large amount of connecting wires; hence, it is limited in application.

III CONTENTS OF THE INVENTION

To overcome the drawbacks in the prior art, the present invention provides a hoist main shaft torque measuring apparatus based on torsional angle measurement, which achieves the measurement of the shaft torque through a light sensing principle and thereby realizes a shaft torque monitoring system utilizing wireless data transmission.

The hoist main shaft torque monitoring apparatus based on torsional angle measurement in the present invention comprises a first base and a second base snap-fitted on a main shaft, and an upper housing and a lower housing respectively arranged on the first base and the second base in symmetry, wherein, a light source generator unit mounted on the first base is symmetrically arranged in the upper housing and lower housing, and the light source generator unit comprises a signal processing unit arranged on the first base and a light source arranged on the signal processing unit, a first aperture is arranged at the intersection between the top of the light source generator unit and the line connecting the light source and the center of the main shaft, a first lens is arranged in the connecting line between the first aperture and the light source, an light sensor element connected to the signal processing unit is arranged at the intersection between the inner wall of the upper and lower housings and the line connecting the light source and the center of the main shaft, a arc-shaped baffle fixed to the second base and concentric with the main shaft is arranged between the light sensor element and the light source generator unit, a second aperture of the same shape and size as the first aperture is arranged on the baffle at a position corresponding to the position of the first aperture, and a second lens designed to focus received light to the light sensor element is arranged between the second aperture and the light sensor element.

The first aperture in the light source generator unit is an arc-shaped aperture concentric with the main shaft.

The signal processing unit comprises a power source connected with the light sensor element, a conditioning circuit, and a wireless transmission module, wherein, the input terminal of the conditioning circuit is connected to the output terminal of the light sensor element, and the output terminal of the conditioning circuit is connected to the wireless transmission module.

The apparatus provided in the present invention utilizes a light sensing principle to realize real-time monitoring of the torque of the main shaft of a mine hoist, and it is also applicable to torque measurement for other shafts. The apparatus can carry out real-time shaft torque measurement without damage to the original equipment connections and foundation, and it employs wireless data transmission and thereby simplifies the wiring and avoids electromagnetic interference. The apparatus can realize torque measurement at different rotation speeds, such as when the shaft is in rest state; in addition, the apparatus is convenient to use, requires very low maintenance cost, can achieve an outstanding effect, and can be applied widely.

IV DESCRIPTION OF DRAWINGS

Figure 1:
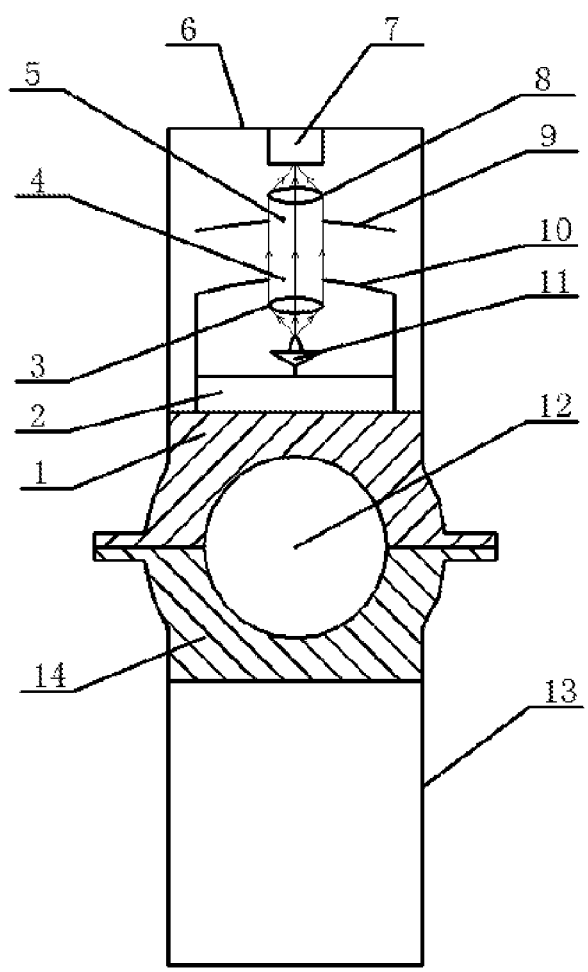
FIG. 1 is an axial view of the apparatus provided in the present invention.
Figure 2:
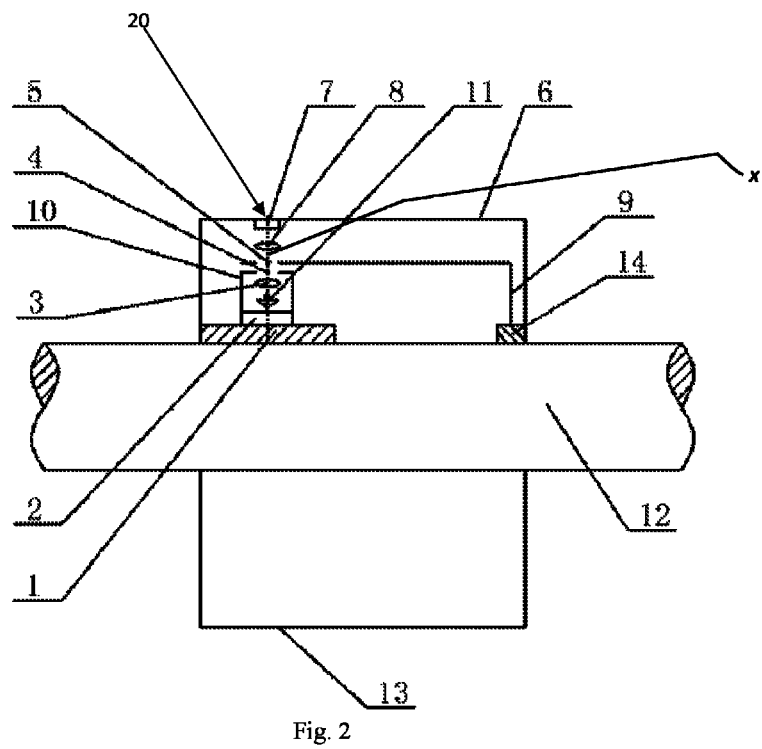
FIG. 2 is a side view of the apparatus provided in the present invention.

Among the drawings: 1—first base, 2—signal processing unit, 3—first lens, 4—first aperture, 5—second aperture, 6—upper housing, 7—light sensor element, 8—second lens, 9—baffle, 10—light source generator unit, 11—light source, 12—main shaft, 13—lower housing, 14—second base, 15—power source, 16—conditioning circuit, 17—wireless transmission module.

V EMBODIMENTS

Hereunder the present invention will be further detailed in an embodiment, with reference to the accompanying drawings:

The hoist main shaft torque monitoring apparatus based on torsional angle measurement in the present invention mainly comprises a first base 1, a second base 14, a light source generator unit 10, a baffle 9, and a light sensor element 7, wherein, the first base 1 and second base 14 are two interlocking parts each having a semi-circular arc groove, and the two bases space apart from each other for 10 cm, and releasably attached on a hoist shaft 12 by bolts; an upper housing 6 and a lower housing 13 are fixed on the first base 1 and the second base 14, respectively. The upper housing and lower housing comprise an inside and outside wall. Light source generator units 10 mounted on the first base 1 are operatively arranged concentrically in the upper housing and the lower housing, and the light source generator unit 10 comprises a signal processing unit 2 arranged on the first base 1 and a light source 11 arranged on the signal processing unit 2, wherein the light sensor element is positioned distant from the main shaft. A first aperture 4 is arranged at the intersection between the top part of the light source generator unit 10 and the line (x) connecting the light source 11 and the center of the main shaft 12, and the first aperture 4 is a circular arc aperture concentric with the main shaft 12; a first lens 3 is arranged in the connecting line between the first aperture 4 and the light source 11, and the light source 11 is mounted at the focal of the first lens 3 near the first base 1; the light sensor element 7 connected to the signal processing unit 2 is arranged at the intersection between the inner wall of the upper and lower housing (Point 20) s and the line (x) connecting the light source 11 and the center of the main shaft 12; a circular arc baffle 9 fixed to the second base 14 and concentric with the main shaft 12 is arranged between the light sensor element 7 and the light source generator unit 10, and a second aperture 5 of the same shape and size as the first aperture 4 is arranged on the baffle 9 at a position corresponding to the position of the first aperture 4; a second lens 8 designed to focus received light to the light sensor element 7 is arranged between the second aperture 5 and the light sensor element 7, and the second lens 8 is mounted in a way that the light sensor element 7 is positioned at the focal of the second lens 8 away from the first base 1.

Figure 3:
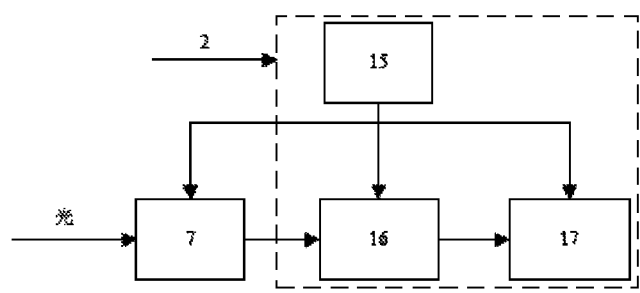
FIG. 3 is a schematic diagram of the signal processing unit in the apparatus provided in the present invention.

As shown in FIG. 3, the signal processing unit 2 comprises a power source 15 connected with the light sensor element 7, a conditioning circuit 16, and a wireless transmission module 17, wherein, the input terminal of the conditioning circuit 16 is connected to the output terminal of the light sensor element 7, and the output terminal of the conditioning circuit 16 is connected to the wireless transmission module 17. The power source 15 supplies power to the light sensor element 7, conditioning circuit 16, wireless transmission module 17, and light source 11 at the same time.

During operating, the apparatus is mounted on the main shaft 12 of the hoist and is kept in relatively rest state. When there is no stress on the main shaft 12, the light from the light source 1 is parallel light after it passes through the first lens 3; since the initial position of first aperture 4 is aligned to the initial position of second aperture 5, thereby the parallel light passing through the first aperture 4 can pass through the second aperture 5 fully, and then is focused by the second lens 8 to the light sensor element 7, so that the light sensor element 7 outputs electric current, and the current is conditioned in the conditioning circuit 16 in the signal processing unit 2 and then is transmitted wirelessly by the wireless transmission module to an upper computer or PC; when the main shaft generates any torque under stress, the main shaft 12 of the hoist will be twisted, and consequently the first base 1 and second base 14 will rotate relatively, the baffle 9 fixed on the second base 14 will rotate along with the second base 14, so that the first aperture 4 and second aperture 5 which initially aligned to each other will be mis-aligned corresponding to the torque. As a result, only a part of the parallel light passing through the first aperture 4 can pass through the second optical aperture 5 and finally reach the light sensor element 7, and accordingly the light sensor element 7 processes the passed parallel light and then transmits an electrical signal corresponding to the light sensation to the upper computer. By comparing the light received by the light sensor element 7 when the main shaft is subjected to different stresses, torsional angle of the first aperture 4 relative to the second aperture 5 can be measured, and thereby the torque on the hoist main shaft 12 can be calculated from the measured torsional angle.

While an embodiment of the present invention is described exemplarily with reference to a hoist shaft, the present invention is not only applicable to torque measurement for hoist main shafts but also applicable to torque detection for other rotating shafts. In addition, in the actual application, the torque value can be calculated by the signal processing unit and then transmitted wirelessly to the upper computer.

The invention claimed is:

1. A hoist main shaft torque monitoring apparatus based on torsional angle measurement, comprising a first base and a second base releasably attached to a main shaft, and an upper housing and a lower housing operatively arranged on the first base and the second base respectively, wherein said upper housing and lower housing comprise an inside and outside wall;

wherein, a light source generator unit mounted on the first base is operatively arranged in the upper housing and the lower housing, and the light source generator unit comprises a signal processing unit arranged on the first base and a light source arranged on the signal processing unit, a first aperture is arranged at the intersection between the top part of the light source generator unit and the line (x) connecting the light source and the center of the main shaft, a first lens is arranged in the connecting line between the first aperture and the light source, a light sensor element attached to the inside wall of the upper housing is positioned distant from the main shaft, and is arranged at the intersection of the upper housing and the line (x) connecting the light source and the center of the main shaft, a circular arc baffle fixed to the second base and concentric with the main shaft is arranged between the light sensor element and the light source generator unit, a second aperture of the same shape and size as the first aperture is arranged on the baffle at a position corresponding to the position of the first aperture, and a second lens designed to focus received light to the light sensor element is arranged between the second aperture and the light sensor element.

2. The hoist main shaft torque monitoring apparatus based on torsional angle measurement according to claim 1, wherein, the first aperture in the light source generator unit is a circular arc aperture concentric with the main shaft.

3. The hoist main shaft torque monitoring apparatus based on torsional angle measurement according to claim 1, wherein, the signal processing unit comprises a power source connected with the light sensor element, a conditioning circuit, and a wireless transmission module, wherein, the input terminal of the conditioning circuit is connected to the output terminal of the light sensor element, and the output terminal of the conditioning circuit is connected to the wireless transmission module.

\* \* \* \* \*